UNITED STATES PATENT OFFICE.

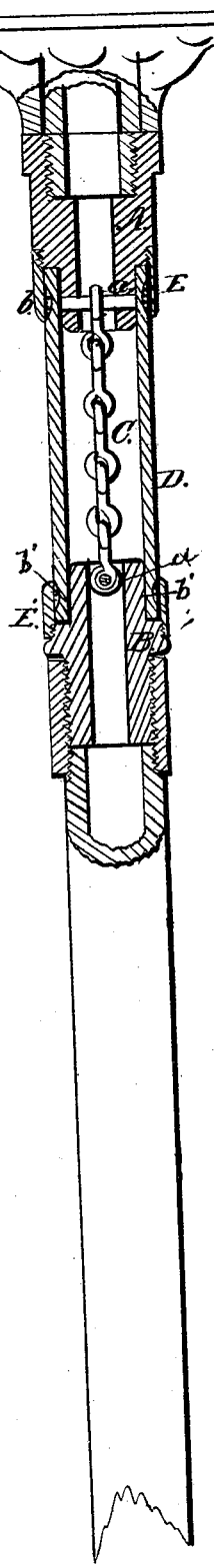

ANTHONY STRATTON, OF BROOKLYN, NEW YORK.

FLEXIBLE JOINT FOR GAS-TUBES.

Specification of Letters Patent No. 29,113, dated July 10, 1860.

*To all whom it may concern:*

Be it known that I, ANTHONY STRATTON, of Brooklyn, in the county of Kings and State of New York, have invented a new and Improved Flexible Joint or Connection for Gas-Tubes; and I do hereby declare that the following is a full, clear, and exact description of the same, reference being had to the annexed drawing, making a part of this specification, said drawing being a vertical central section of my invention.

The object of this invention is to obtain a very simple, secure and gas tight flexible joint or connection for gas tubes, one that will admit of a universal movement of suspended tubes to which burners are attached, and the consequent adjusting of the burners in any position most favorable to shed the light properly for the person using it.

The ordinary single joints, admit of the adjustment of the tube in one direction only. Universal joints constructed in the usual way have been employed but they are attended with considerable expense in construction and are liable to leak and get out of order.

The within described invention consists in suspending the pendent-burner tube to the main tube by means of a chain or its equivalent to obtain a secure and flexible connection and covering the ends of the tubes or their sockets with a tube of india-rubber or other similar substance to form a gas-tight connection substantially as hereinafter described.

To enable those skilled in the art to fully understand and construct my invention I will proceed to describe it.

A represents the socket of a main or stationary gas tube and B, is the socket of a suspended burner-tube. These sockets A, B, may be secured into their respective tubes as usual.

Through the outer part of each socket A, B, there passes a rod $a$, and these rods pass through the end links of a chain C, which connects the sockets together and consequently their respective tubes.

The chain C, is sufficiently long to allow a little space between the sockets A, B, as shown clearly in the drawing. It will be seen therefore that the chain C, will allow the pendent tube to swing freely in any direction and firmly secure it to the main tube.

D, is an india-rubber tube or a tube constructed of similar flexible material impervious to gas. One end of this tube D, is fitted on the socket A, and is secured thereto by wrapping fine wire $b$, around it and the end of the socket A, has a collar E secured on it said collar covering the wire wrapping $b$, and insuring the proper gas-tight connection of the tube D, with the socket A. The opposite end of the tube D, is connected to the socket B, in a similar manner, $b'$, representing the wire wrapping and E', the collar which is secured to the socket B.

From the above description it will be seen that a perfectly flexible and durable joint or connection is obtained and one that may be applied at a small cost.

Having thus described my invention what I claim as new and desire to secure by Letters Patent, is—

The chain C, or its equivalent in connection with the india-rubber or other flexible tube D, applied to the sockets A, B, substantially as and for the purpose set forth.

ANTHONY STRATTON.

Witnesses:
L. W. BENDRÉ,
B. GIROUX.